(12) United States Patent
Xie et al.

(10) Patent No.: US 8,698,800 B2
(45) Date of Patent: Apr. 15, 2014

(54) METHOD AND APPARATUS FOR NON-SHRINKING MESH SMOOTHING USING LOCAL FITTING

(75) Inventors: Hui Xie, Plainsboro, NJ (US); Jin Zhou, Port Jefferson Station, NY (US); Tong Fang, Morganville, NJ (US)

(73) Assignee: Siemens Corporation, Iselin, NJ (US)

( * ) Notice: Subject to any disclaimer, the term of this patent is extended or adjusted under 35 U.S.C. 154(b) by 2279 days.

(21) Appl. No.: 11/466,194

(22) Filed: Aug. 22, 2006

(65) Prior Publication Data

US 2007/0120850 A1 May 31, 2007

Related U.S. Application Data

(60) Provisional application No. 60/740,366, filed on Nov. 29, 2005, provisional application No. 60/742,440, filed on Dec. 5, 2005, provisional application No. 60/742,503, filed on Dec. 5, 2005.

(51) Int. Cl.
*G06T 17/20* (2006.01)
(52) U.S. Cl.
USPC .......................................................... 345/423
(58) Field of Classification Search
CPC .............................. G06T 17/205; G06T 15/405
USPC .......................................................... 345/423
See application file for complete search history.

(56) References Cited

U.S. PATENT DOCUMENTS

| | | | |
|---|---|---|---|
| 6,580,427 B1* | 6/2003 | Orenstein et al. | 345/422 |
| 7,084,869 B2* | 8/2006 | Sriram et al. | 345/419 |
| 2005/0052452 A1* | 3/2005 | Baumberg | 345/419 |
| 2007/0058132 A1* | 3/2007 | Dai | 351/246 |

OTHER PUBLICATIONS

D. Levin, "Mesh-Independent Surface Interpolation", Geometric Modeling for Scientific Visualization, Edited by Brunnett, Hamann and Mueller, Springer-Verlag, 2003, pp. 37-49.
F. Bernardini, et al., "The Ball-Pivoting Algorithm for Surface Reconstruction", IEEE Transactions on Visualization and Computer Graphics, 1999.
Y. Chen, et al., "Filleting and Rounding Using a Point-Based Method", Proc. of DETC'05, 2005 ASME Design Engineering Technical Conferences and Computers and Information in Engineering Conference, Long Beach, CA, Sep. 24-28, 2005, pp. 1-10.
T. Igarashi, et al., "Smooth Meshes for Sketch-Based Freeform Modeling", Proc. of the 2003 Symposium on Interactive 3D Graphics, Monterey, CA, 2003, pp. 139-142.

(Continued)

*Primary Examiner* — Aaron M Richer
(74) *Attorney, Agent, or Firm* — Michele L. Conover

(57) ABSTRACT

A method and apparatus for the smoothing of a mesh surface is disclosed whereby neighboring vertices of a target vertex are identified, for example, by identifying the neighboring vertices within a desired distance from the target vertex. A normal of the target vertex is determined as a function of, for example, the features of a set of neighbor triangles corresponding to the set of neighboring vertices. A local coordinate system is then established. Unknowns in a quadratic surface function are then solved as a function of the position of the neighboring vertices with respect to the local coordinate system and new x and y coordinates in the local coordinate system are determined for the target vertex. These new x and y coordinates are entered into the quadratic surface function to obtain a new smoothed z coordinate for the target vertex.

21 Claims, 6 Drawing Sheets

(56) References Cited

OTHER PUBLICATIONS

M. Desbrun, et al., "Implicit Fairing of Irregular Meshes Using Diffusion and Curvature Flow", Proc. of the 28th Annual Conference on Computer Graphics and Interactive Techniques, 1999, pp. 317-324.

T. Jones, et al., "Non-Iterative, Feature-Preserving Mesh Smoothing", ACM Transactions on Graphics (TOG), Proc. of ACM SIGGRAPH, vol. 22, Issue 3, Jul. 2003, pp. 943-949.

L. Kobbelt, "Discrete Fairing and Variational Subdivision for Freeform Surface Design", The Visual Conputer, 2000, pp. 142-158.

S. Fleishman, et al., "Bilateral Mesh Denoising", ACM Transactions on Graphics TOG), Proc. of ACM SIGGRAPH, vol. 22, Issue 3, Jul. 2003, pp. 950-953.

W. Press, et al., "Numerical Recipes in C: The Art of Scientific Computing", Cambridge, Cambridge University Press, 1989, pp. 59-71.

G. Taubin, "A Signal Processing Approach to Fair Surface Design", IBM T.J. Watson Research Center, ACM Press, New York, NY, 1995.

* cited by examiner

METHOD AND APPARATUS FOR NON-SHRINKING MESH SMOOTHING USING LOCAL FITTING

This patent application claims the benefit of U.S. Provisional Application Ser. No. 60/740,366, filed Nov. 29, 2005, which is hereby incorporated by reference herein in its entirety.

CROSS-REFERENCE TO RELATED APPLICATIONS

The present application is also related to U.S. patent application Ser. No. 11/466,204, titled Method and Apparatus for Fast and Efficient Mesh Simplification; and U.S. patent application Ser. No. 11/466,211, titled Method and Apparatus for Discrete Mesh Filleting and Rounding Through Ball Pivoting, both of which are being filed simultaneously herewith and are hereby incorporated by reference herein in their entirety.

BACKGROUND OF THE INVENTION

The present invention relates generally to two- and three-dimensional mesh shapes and, more particularly, to the smoothing of the meshes on the surfaces of such shapes.

Many applications, such as medical and industrial design and manufacturing applications, involve manipulating and editing a digital model of an object. As one skilled in the art will understand, such a digital model may be created by scanning an object to create a point cloud representation of the object. The surface of such a model of a scanned object typically consists of a plurality of points, the number of which is a function of the resolution of the scanning process. Once such a point cloud representation has been obtained, the surface of the object may then be approximated by connecting the points of the point cloud to form a plurality of geometric shapes, such as triangles, on the surface of the model. This model may then, for example, be edited by using computer aided design (CAD) software programs or similar specialized image manipulation software programs.

FIG. 1 shows an illustrative model of the surface 101 of such an object. Referring to that figure, points 103 are, illustratively, the points in a point cloud that are obtained from the scanning of the object. Then, as discussed above, well-known methods are used to connect the points in a way such that the surface of the object is approximated by a plurality of triangles 102, referred to herein collectively as a triangle mesh. One such method for constructing a surface by connecting points and forming triangles is described, for example, in F. Bernardini et al., *The Ball-Pivoting Algorithm for Surface Reconstruction*, IEEE Transactions on Visualization and Computer Graphics, 5(4), October-December, 1999, pp. 349-359, which is hereby incorporated by reference herein in its entirety. Many other methods for creating mesh surfaces have also been developed and are well-known. As one skilled in the art will recognize, mesh surfaces created according to such prior methods contain noise caused by, for example, the scanning process and/or the mesh-creation process. When such noise is present, the model of an object may appear bumpy or may otherwise deviate from the actual appearance of the object scanned to create the model.

In order to correct for such noise in models, various smoothing operations have been performed on meshes to create more accurate models of surfaces. Such smoothing operations are well-known and typically include either geometric or signal processing methods. As is well known, geometric methods typically use discrete approximation to move mesh vertex points by, for example, weighting and averaging the position of each mesh vertex point with the points of nearby neighboring points to smooth the model of a surface. Signal processing methods, on the other hand, use various processing techniques, such as well-known isotropic or anisotropic filtering, to smooth a mesh surface.

SUMMARY OF THE INVENTION

The present inventors have recognized that, while prior methods for the smoothing of a mesh surface are advantageous in many regards, they are also disadvantageous in certain respects. Specifically, the present inventors have recognized that, while prior mesh smoothing methods could produce smoothed surfaces by removing noise from a mesh model of an object, they were most useful only to remove noise from meshes with fairly uniform vertex distributions. If the mesh vertex distribution was not relatively uniform, these prior methods did not perform as well in removing such noise. Also, as one skilled in the art will recognize, prior methods typically resulted in shrinkage of the model. In such a case, various methods for scaling a model back to its original size have been used, but such methods could alter the shape of the model.

Accordingly, the present inventors have invented a method for smoothing a mesh surface whereby neighboring vertices of a target vertex are identified, for example, by identifying the neighboring vertices within a desired distance from the target vertex. A normal of the target vertex is determined as a function of, for example, the features of a set of neighbor triangles corresponding to the set of neighboring vertices. A local coordinate system is then established by illustratively setting the z axis of the system to this normal. Unknowns in a quadratic surface function are then solved as a function of the position of the neighboring vertices with respect to the local coordinate system. Such solutions may be obtained, for example, by using well-known singular value decomposition methods. Once the unknowns are determined then new x and y coordinates in the local coordinate system are determined for the target vertex. These new coordinates may be determined as averages, for example, of the x and y coordinates of the neighboring vertices. Once the new x and y coordinates are determined for the target vertex, they are entered into the quadratic surface function to obtain a new smoothed z coordinate for the target vertex. By progressively performing this method on all or selected vertices in a mesh surface, a smoothed surface may be advantageously obtained.

These and other advantages of the invention will be apparent to those of ordinary skill in the art by reference to the following detailed description and the accompanying drawings.

DETAILED DESCRIPTION

The present inventors have recognized that it would be advantageous in many applications to produce a smoothed mesh surface by fitting a quadratic function to each vertex in the mesh surface to be smoothed. In order to fit such a function to each vertex, a target vertex is first identified and its neighboring vertices in the mesh are identified. Then, a local coordinate system is identified for the target vertex. The local coordinates for each of the neighboring vertices in the mesh are determined and linear equations are solved to identify unknown variables in the quadratic function. Then, once the quadratic function has been determined, the new smoothed location of the target vertex point on that function can be determined. Such a method is described in further detail herein below.

Figure 1:
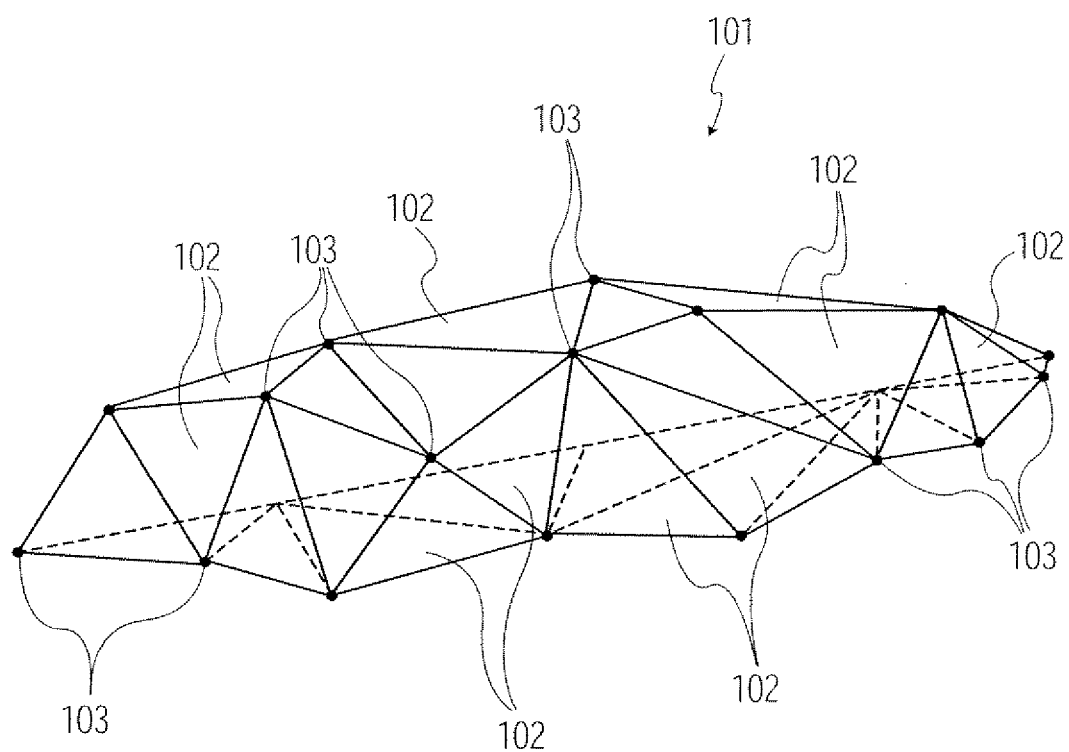
FIG. 1 shows a model of a 3D shape having a triangle mesh surface.
Figure 2:
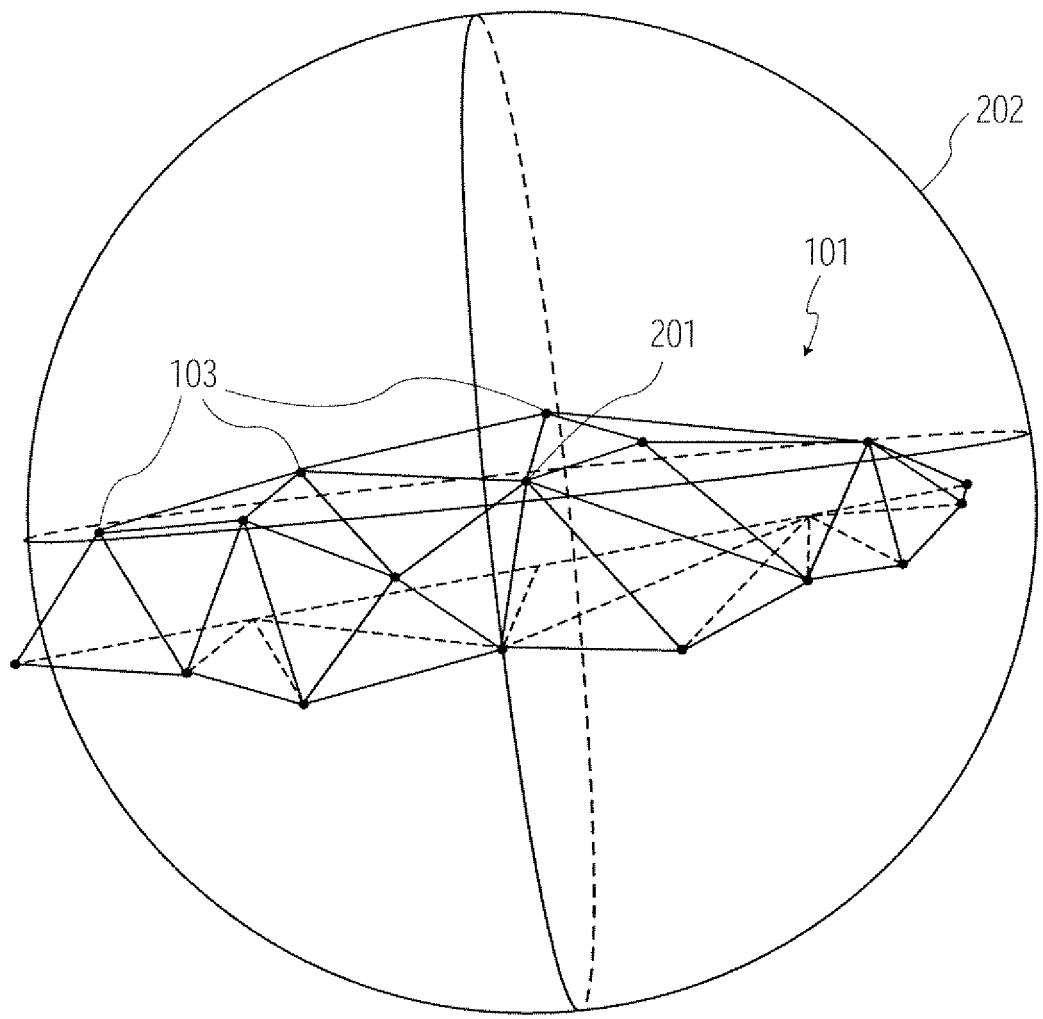
FIG. 2 shows how neighboring vertices of a target vertex may be identified as a function of a distance from the target vertex.

FIG. 2 shows the mesh surface 101 of FIG. 1 having, once again, a plurality of triangle vertices 103. Referring to FIG. 2, during an illustrative smoothing operation, target vertex 201 is selected for the determination of a new, smoothed position. As discussed above, in a first step, vertices that are proximately located to the target vertex 201, also referred to herein as neighboring vertices, are identified. Illustratively, as shown in FIG. 2, sphere 202 having a center at the target vertex and having a radius 103 can be used such that all points within the distance corresponding to the radius 103 from target vertex 201 are identified as neighboring vertices. One skilled in the art will recognize that many suitable methods may be used to identify such neighboring vertices. One skilled in the art will also recognize that the result of the smoothing operation well depend upon how many points are selected (e.g., in the example of FIG. 2, how large the radius of sphere 202). More particularly, as the radius of sphere 202 increases more local features will be smoothed and as it decreases less smoothing would take place, but more local features would be preserved.

Figure 3:
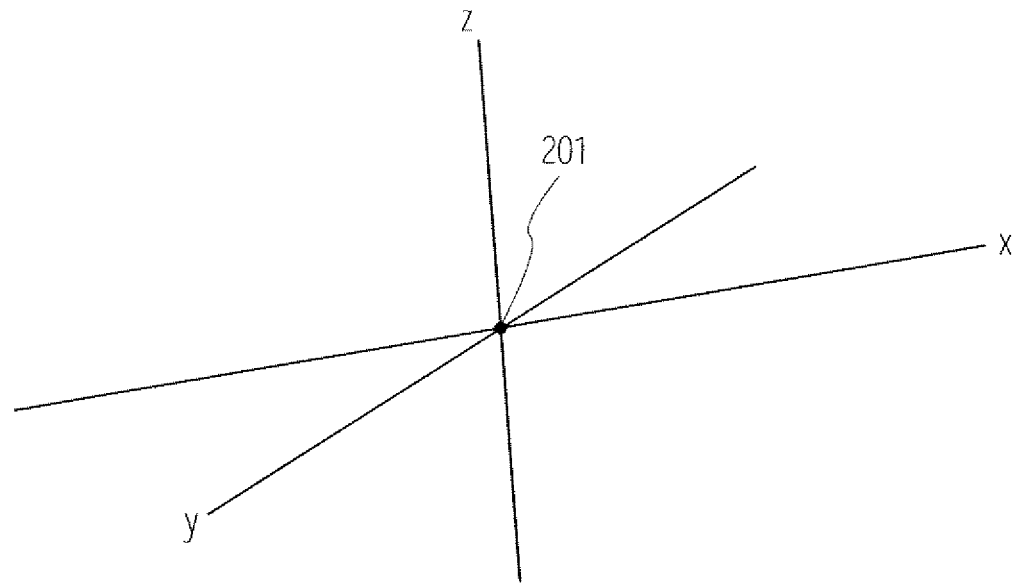
FIG. 3 shows a local coordinate system corresponding to the target vertex.

Once the neighboring vertices have been identified, then, in accordance with an embodiment of the present invention, a local coordinate system, such as that shown in FIG. 3, is identified for the target vertex. As used herein, the term local coordinate system refers to a coordinate system such as the system shown in FIG. 3 that is formed with respect to a local point, such as target vertex 201. In particular, referring to FIG. 3, target vertex 201 of FIG. 2 is set as the origin of a coordinate system having x, y and z axes as shown in FIG. 3. As one skilled in the art will also recognize, there are many such coordinate systems that can be constructed having an origin of target vertex 201 i.e., the x, y and z axes may be oriented in many different directions while still having target vertex 201 as the origin. Thus, it is necessary when identifying such a local coordinate system to identify the orientation of the local coordinate system. Illustratively, in accordance with an embodiment of the present invention, the orientation of a coordinate system for target vertex 201 is selected as a function of the surrounding geographic features of the mesh surface. More particularly, in one illustrative embodiment, the features of the faces of triangles in the mesh are used to determine the normal of target vertex 201. This normal is then set as the z-axis of the target vertex 201.

Figure 4:
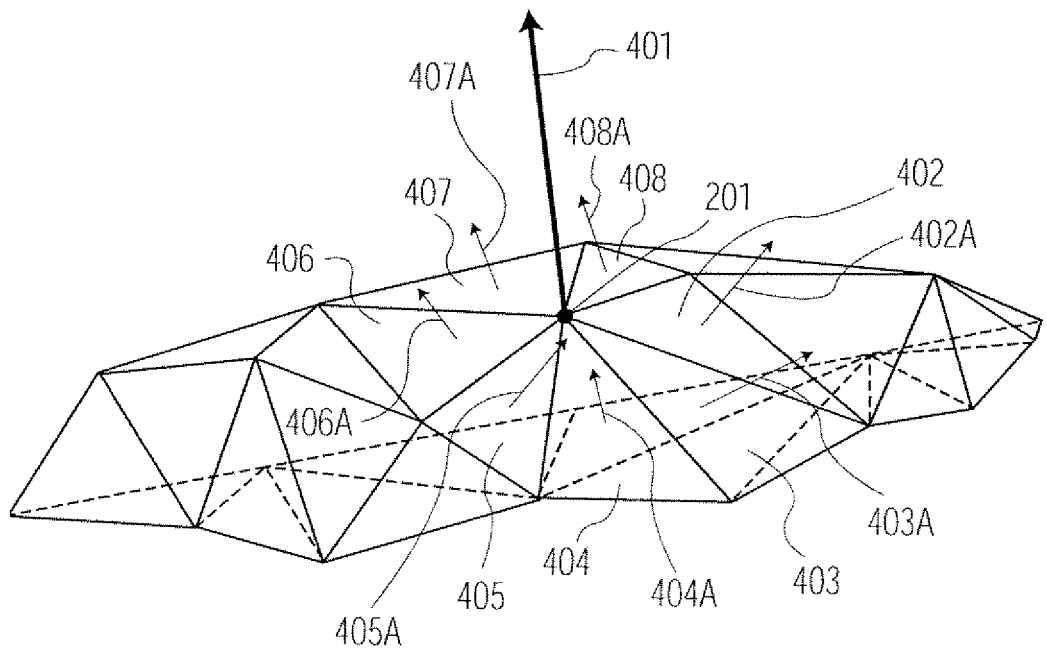
FIG. 4 shows how a normal of a target vertex can be determined as a function of the features of triangles in a mesh surface.

FIG. 4 shows one such method of determining the normal of the target vertex. Referring to that figure, once again mesh surface 101 is shown having a plurality of vertices that are connected to form a mesh of triangles, such as triangles 402-408, using well known methods in order to determine the normal of target vertex 201, a set of neighbor triangles is identified as those triangles having at least one vertex in the set of neighboring vertices. Once again, the neighboring vertices of target vertex 201 may be selected, as described herein above, by determining which vertices are within a desired distance from the target vertex. Once this set of neighbor triangles have been identified, then a vector can be identified in a normal direction for each of those triangles. As one skilled in the art will realize, the normal direction for each triangle may be, illustratively, the direction perpendicular to the face of that triangle. In accordance with this illustrative embodiment, the normal direction is then weighted according to the surface area of the triangle to create a normal vector having a magnitude directly related to the surface area. Methods for determining the surface area of triangles in a mesh surface will be obvious to one skilled in the art. Once these vectors, such as vectors 402A-408A corresponding to triangles 402-408, respectively, are identified then the weighted average of the vectors is calculated. The orientation of the weighted average is then used as the normal 401 of target vertex 201 which is, in turn, then used as the z axis of a local coordinate system for target vertex 201. Since, as discussed above, target vertex 201 is also the origin of the local coordinate systems, it is then possible to identify x and y axes orthogonal to the z axis. As one skilled in the art will recognize, the precise orientation of the x and y axes is not critically important as long as the orientations of the axes, once identified, remain constant for the local coordinate system for each target vertex.

Figure 5:
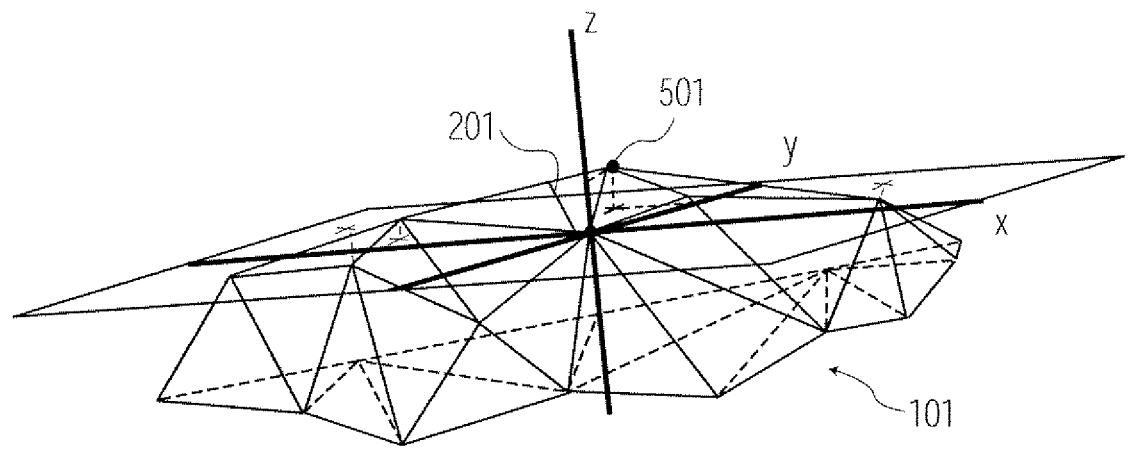
FIG. 5 shows how a local coordinate system can be determined as a function of the normal of the target vertex of FIG. 4.
Figure 6:
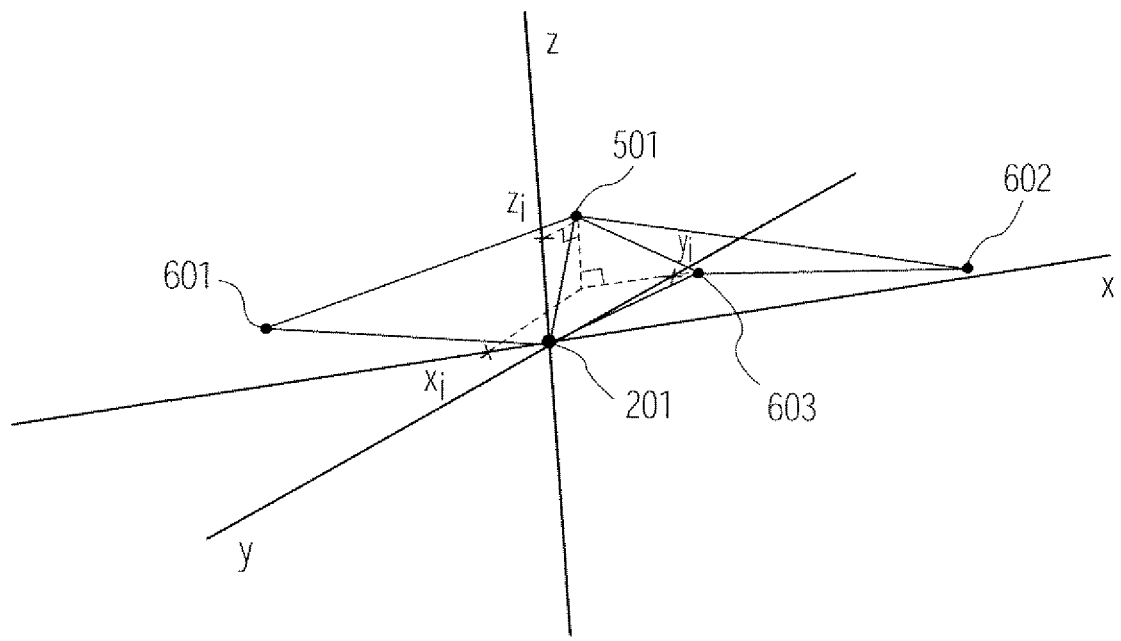
FIG. 6 shows how the coordinates of the neighboring vertex points can be determined as a function of the local coordinate system of FIG. 5.

As shown in FIG. 5, the end result of the foregoing method is a local coordinate system for target vertex 201 on shape 101 that has x, y and z axes determined as a function of the local geometry of the mesh surface. In accordance with the present embodiment, each neighboring vertex is then mapped onto this local coordinate system. For example, referring to FIG. 5, the coordinates of neighboring vertex 501 are identified with respect to the local coordinate system. FIG. 6 shows an expanded view of neighboring vertex 501 in relation to the local coordinate system. Specifically, the x, y and z coordinates $x_i$, $y_i$ and $z_i$ of neighboring vertex 501 are identified with respect to the local coordinate system having an origin at target vertex 201 and an orientation determined as described herein above. Local coordinates for each of the neighboring vertices, such as illustrative vertices 601-603, are also then determined.

Once the coordinates for each neighboring vertex have been identified with respect to the local coordinate system, then a quadratic function representing a smoothed surface can be fit to those points. Such a quadratic function may be defined, illustratively, by the function:

$$z = ax^2 + by^2 + cxy + dx + ey + f \qquad \text{(Equation 1)}$$

where x, y and z are the local coordinates of a vertex and a, b, c, d, e and f are unknowns to be solved. As one skilled in the art will recognize, by applying the local coordinates of each neighboring vertex to this function, a linear equation system Ap=b is then formed. Such a linear equation system can be expressed as a matrix:

$$\begin{bmatrix} x_1^2 & y_1^2 & x_1 y_1 & x_1 & y_1 & 1 \\ x_2^2 & y_2^2 & x_2 y_2 & x_2 & y_2 & 1 \\ \cdots & \cdots & \cdots & \cdots & \cdots & \cdots \\ x_m^2 & y_m^2 & x_m y_m & x_m & y_m & 1 \end{bmatrix} \begin{bmatrix} a \\ b \\ c \\ d \\ e \\ f \end{bmatrix} = \begin{bmatrix} z_1 \\ z_2 \\ \vdots \\ z_m \end{bmatrix} \quad \text{(Equation 2)}$$

As one skilled in the art will recognize, in the expression Ap=b, b is the set of z coordinate values for the neighboring vertices and p is the set of unknowns a, b, c, d, e and f.

Once such a linear equation system has been identified, then it becomes possible to solve for the variables a-f using well-known techniques. One such technique, singular value decomposition (SVD), may be especially advantageous in this regard. SVD is a known canonical linear equation technique for manipulating and solving unknowns in matrices that are either singular or very close to singular. SVD techniques are widely used to decompose a matrix into several component matrices that identify and approximate the original matrix. Such SVD methods are based on the theory that any M×N matrix A, whose number of rows M Is greater than or equal to its number of columns N, can be written as the product of an M×N column-orthogonal matrix U, an N×N diagonal matrix W with positive or zero elements (referred to in SVD techniques as the singular values), and the transpose of an N×N orthogonal matrix V. Specifically, the form of an M×N matrix that has been rewritten according to the foregoing can be expressed as:

$$[A] = [U] \cdot \begin{bmatrix} w_1 & & & & \\ & w_2 & & & \\ & & \cdots & & \\ & & & \cdots & \\ & & & & w_N \end{bmatrix} \cdot [V^T] \quad \text{(Equation 3)}$$

where the variables are as described above. The matrices U and V are each orthogonal in the sense that their columns are orthonormal:

$$\sum_{i=1}^{M} U_{ik} U_{in} = \delta_{kn} \quad 1 \leq k \leq N, 1 \leq n \leq N \quad \text{(Equation 4)}$$

$$\sum_{j=1}^{N} V_{jk} V_{jn} = \delta_{kn} \quad 1 \leq k \leq N, 1 \leq n \leq N \quad \text{(Equation 5)}$$

where $U^T U = V^T V = I$ and the variables are as described above. Thus, the values of for the matrices U and V are known.

Accordingly, recalling the expression Ap=b, discussed above, where p is the set of unknowns to be solved, and b represents the known set of z-coordinate values for the set of neighboring vertex points, if values for matrix A can be determined, then the set of unknowns of p can be solved. Advantageously, as one skilled in the art will recognize, the inverse of the matrix A can be expressed as the function:

$$A^{-1} = V \left[ diag\left(\frac{1}{w_j}\right) \right] U^T \quad \text{(Equation 6)}$$

where the variables are as described herein above. Thus, since the values for V, $w_j$ and U are known, it follows that the values for $A^{-1}$ are also known. As a result, the values for the set of unknowns a, b, c, d, e and f can be advantageously obtained. Referring once again to Equation 1, therefore, the unknowns in are identified and a quadratic equation representing a fitting surface is constructed as a function of the position of the target vertex and the neighboring vertices. Once this fitting surface has been identified, in accordance with an embodiment of the present invention, the x and y coordinates of the target vertex are moved in the local coordinate system by determining the average x and y coordinates for all neighboring vertices, once again identified as described herein above. Once this average x and y position are determined, then these values of x and y can then be input into Equation 1, with the now-known variables a, b, c, d, e and f, and a new z coordinate for the target vertex can be obtained.

Figure 7:
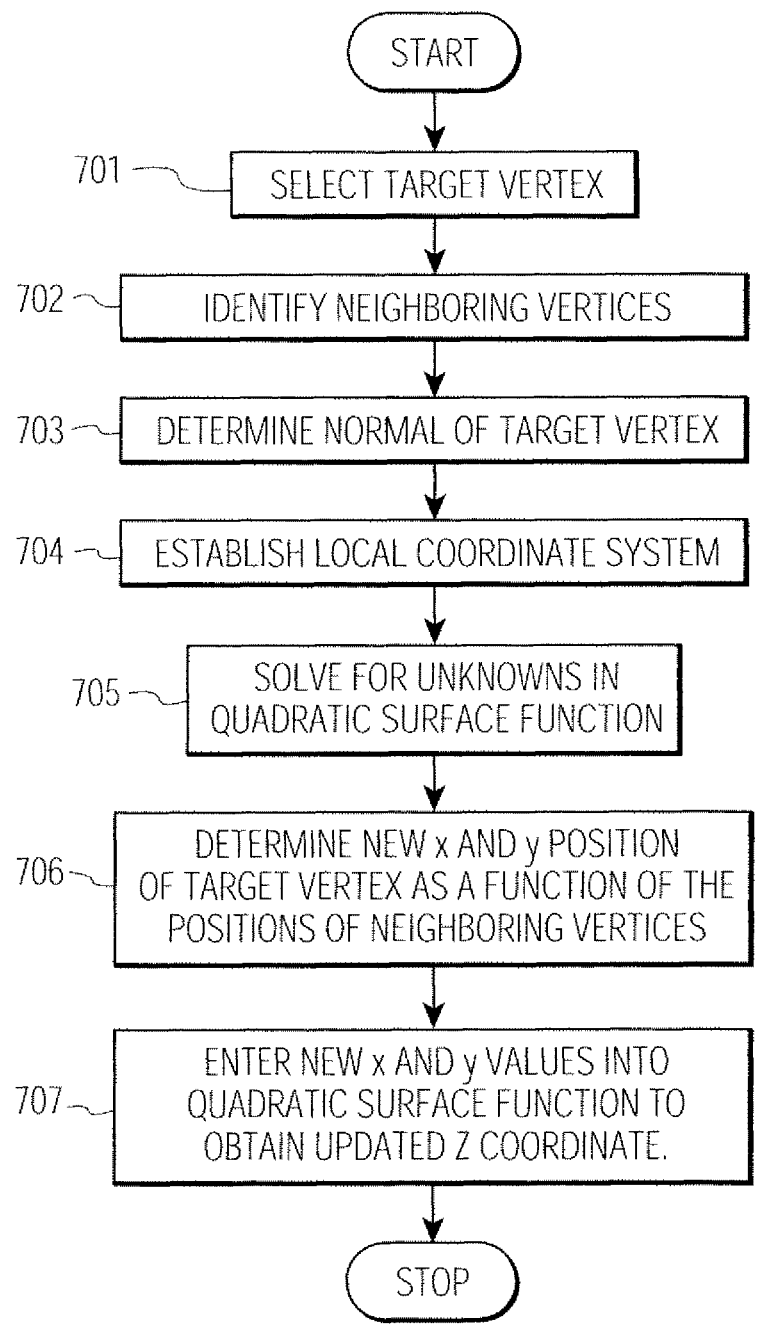
FIG. 7 is a flow chart showing the steps of a method in accordance with an embodiment of the present invention.

FIG. 7 shows a method in accordance with one embodiment of the present invention. Referring to that figure, at step 701, a target vertex is selected for smoothing. Next, at step 702, neighboring vertices are identified, for example, by identifying the neighboring vertices within a desired distance from the target vertex. Then, at step 703, the normal of the target vertex is determined as a function of, for example, features of a set of neighbor triangles. At step 704, a local coordinate system is then established by, once again illustratively, setting the z axis of the system to the normal determined in step 703. Then, at step 705, unknowns in a quadratic surface function are solved as a function of the position of the neighboring vertices with respect to the local coordinate system. Such solutions may be obtained, for example, by using SVD methods as discussed herein above. Once the unknowns are determined then, at step 706, new x and y coordinates in the local coordinate system are determined for the target vertex. These new coordinates may be determined as averages, for example, of the x and y coordinates of the neighboring vertices. Once the new x and y coordinates are determined for the target vertex, then, at step 707, they are entered into the quadratic surface function to obtain a new smoothed z coordinate for the target vertex. By progressively performing this method on all or selected vertices in a mesh surface, a smoothed surface may be advantageously obtained.

Figure 8:
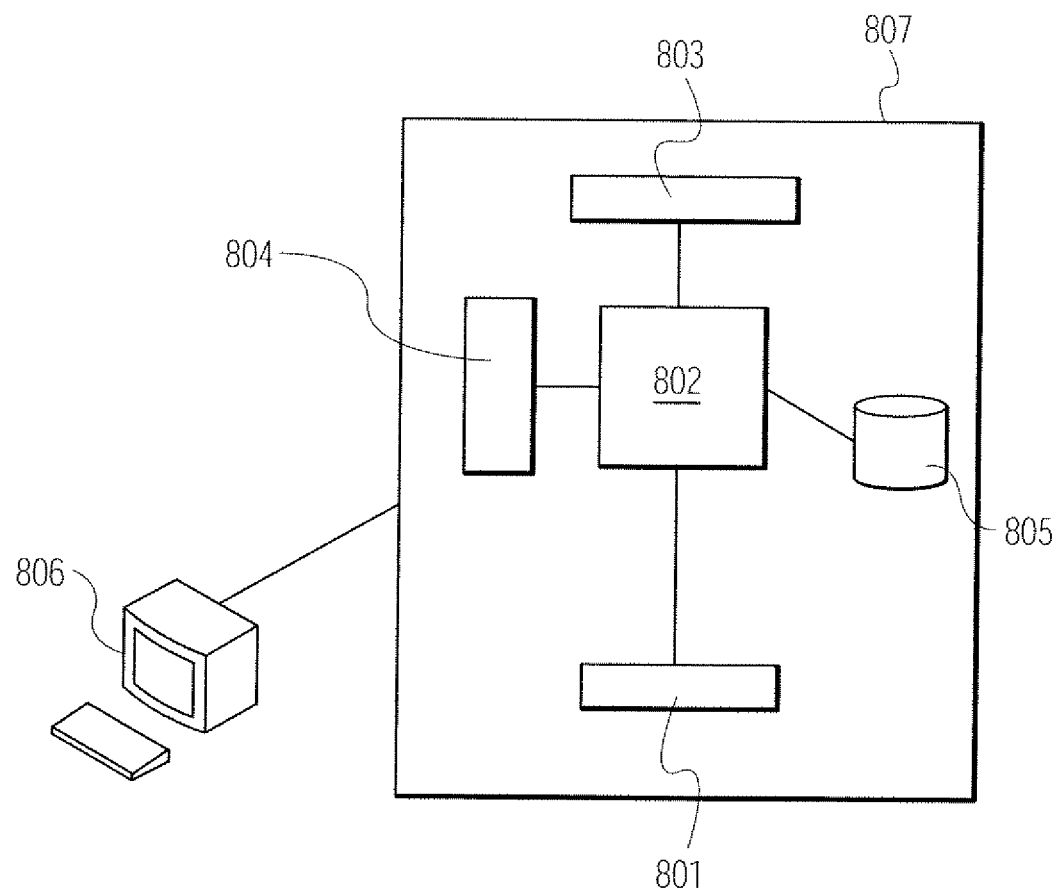
FIG. 8 shows a computer adapted to perform the illustrative steps of the method of FIG. 7 as well as other functions associated with the smoothing of triangle mesh surfaces.

The foregoing embodiments are generally described in terms of manipulating objects, such as vertices of triangles, in order to smooth a triangle mesh model of a 2D or 3D shape. One skilled in the art will recognize that such manipulations may be, in various embodiments, virtual manipulations accomplished in the memory or other circuitry/hardware of an illustrative computer aided design (CAD) system. Such a CAD system may be adapted to perform these manipulations, as well as to perform various methods in accordance with the above-described embodiments, using a programmable computer running software adapted to perform such virtual manipulations and methods. An illustrative programmable computer useful for these purposes is shown in FIG. 8. Referring to that figure, a CAD system 807 is implemented on a suitable computer adapted to receive, store and transmit data such as the aforementioned positional information associated with the edges and triangles of a triangle mesh model. Specifically, illustrative CAD system 807 may have, for example, a processor 802 (or multiple processors) which controls the overall operation of the CAD system 807. Such operation is defined by computer program instructions stored in a memory 803 and executed by processor 802. The memory 803 may be any type of computer readable medium, including without limitation electronic, magnetic, or optical media. Further, while one memory unit 803 is shown in FIG. 8, it is to be understood that memory unit 803 could comprise multiple memory units, with such memory units comprising any type of memory. CAD system 807 also comprises illustrative modem 801 and network interface 804. CAD system 807 also illustratively comprises a storage medium, such as a computer hard disk drive 805 for storing, for example, data and computer programs adapted for use in accordance with the principles of the present invention as described hereinabove. Finally, CAD system 807 also illustratively comprises one or more input/output devices, represented in FIG. 8 as terminal 806, for allowing interaction with, for example, a technician or database administrator. One skilled in the art will recognize that CAD system 807 is merely illustrative in nature and that various hardware and software components may be adapted for equally advantageous use in a computer in accordance with the principles of the present invention.

One skilled in the art will also recognize that the software stored in the computer system of FIG. 8 may be adapted to perform various tasks in accordance with the principles of the present invention. In particular, such software may be graphical software adapted to import surface models of shapes, for example those models generated from three-dimensional laser scanning of objects. In addition, such software may allow for selective editing of those models in a way that smooths those models. The software of a computer-based system such as CAD system 807 may also be adapted to perform other functions which will be obvious in light of the teachings herein. All such functions are intended to be contemplated by these teachings.

The invention claimed is:

1. A method for smoothing a triangle mesh surface, said triangle mesh surface comprising a target vertex to be smoothed, said method being performed by a processor and comprising:
   identifying a plurality of neighboring vertices in said triangle mesh surface as a function of a position of said target vertex;
   determining a position of said target vertex and a position of each vertex in said plurality of neighboring vertices in a coordinate system associated with said target vertex;
   determining a surface function as a function of said position of said target vertex and said position of each vertex in said plurality of neighboring vertices; and
   determining a new position of said target vertex as a function of said surface function;
   wherein said step of determining a new position of said target vertex comprises determining a new x coordinate and a new y coordinate of said target vertex as a function of the x coordinates and the y coordinates of said vertices in said plurality of neighboring vertices, respectively; and
   wherein a z coordinate for said target vertex is determined by inputting said new x coordinate and said new y coordinate of said target vertex into said surface function.

2. The method of claim 1 wherein said step of identifying a plurality of neighboring vertices comprises identifying the neighboring vertices within a desired distance of said target vertex.

3. The method of claim 1 wherein said local coordinate system is determined in a way such that the target vertex is positioned at the origin of the local coordinate system and the z axis is determined as a function of a normal to said target vertex.

4. The method of claim 3 wherein said normal to said target vertex is determined as a function of at least one feature of a neighboring triangle in said triangle mesh surface.

5. The method of claim 4 wherein said at least one feature comprises a normal of said neighboring triangle and a surface area of said neighboring triangle.

6. The method of claim 1 wherein said step of determining a surface function comprises determining at least a first unknown of said surface function using a singular value decomposition technique.

7. The method of claim 1 wherein said new x coordinate of said target vertex is determined as an average of the x coordinates of said vertices in said plurality of neighboring vertices and said new y coordinate of said target vertex is determined as an average of the y coordinates of said vertices in said plurality of neighboring vertices.

8. The method of claim 1 wherein said surface function comprises a quadratic function.

9. An apparatus for use in smoothing a triangle mesh surface, said triangle mesh surface comprising a target vertex to be smoothed, said apparatus comprising:
   means for identifying a plurality of neighboring vertices in said triangle mesh surface as a function of a position of said target vertex;
   means for determining a position of said target vertex and a position of each vertex in said plurality of neighboring vertices in a coordinate system associated with said target vertex;
   means for determining a surface function as a function of said position of said target vertex and said position of each vertex in said plurality of neighboring vertices; and
   means for determining a new position of said target vertex as a function of said surface function;
   wherein said means for determining the new position of said target vertex comprises means for determining a new x coordinate and a new y coordinate of said target vertex as a function of the x coordinates and the y coordinates of said vertices in said plurality of neighboring vertices, respectively; and
   wherein the apparatus is adapted to determine a z coordinate for said target vertex by inputting said new x coordinate and said new y coordinate of said target vertex into said surface function.

10. The apparatus of claim 9 wherein said means for identifying a plurality of neighboring vertices comprises means for identifying the neighboring vertices within a desired distance of said target vertex.

11. The apparatus of claim 9 wherein the target vertex is positioned at the origin of the local coordinate system and the z axis corresponds to a normal to said target vertex.

12. The apparatus of claim 9 wherein said means for determining a new x coordinate of said target vertex comprises means for determining said new x coordinate as an average of the x coordinates of said vertices in said plurality of neighboring vertices and said means for determining a new y coordinate of said target vertex comprises means for determining said new y coordinate as an average of the y coordinates of said vertices in said plurality of neighboring vertices.

13. The apparatus of claim 9 wherein said surface function comprises a quadratic function.

14. A non-transitory computer readable medium comprising computer program instructions which, when executed by a processor, define steps for smoothing a triangle mesh surface, said triangle mesh surface comprising a target vertex to be smoothed, said steps comprising:
   identifying a plurality of neighboring vertices in said triangle mesh surface as a function of a position of said target vertex;

determining a position of said target vertex and a position of each vertex in said plurality of neighboring vertices in a coordinate system associated with said target vertex;

determining a surface function as a function of said position of said target vertex and said position of each vertex in said plurality of neighboring vertices;

determining a new position of said target vertex as a function of said surface function, said computer program instructions defining the step of determining a new position of said target vertex comprising computer program instructions defining the step of determining a new x coordinate and a new y coordinate of said target vertex as a function of the x coordinates and the y coordinates of said vertices in said plurality of neighboring vertices, respectively; and determining a z coordinate for said target vertex by inputting said new x coordinate and said new y coordinate of said target vertex into said surface function.

15. The computer readable medium of claim 14 wherein said computer program instructions defining the step of identifying a plurality of neighboring vertices comprise computer program instructions defining the step of identifying the neighboring vertices within a desired distance of said target vertex.

16. The computer readable medium of claim 14 further comprising computer program instructions defining the step of determining said local coordinate system in a way such that the target vertex is positioned at the origin of the local coordinate system and the z axis is determined as a function of a normal to said target vertex.

17. The computer readable medium of claim 16 further comprising computer program instructions defining the step of determining the normal to said target vertex as a function of at least one feature of a neighboring triangle in said triangle mesh surface.

18. The computer readable medium of claim 17 wherein said at least one feature comprises a normal of said neighboring triangle and a surface area of said neighboring triangle.

19. The computer readable medium of claim 14 wherein said computer program instructions defining the step of determining a surface function comprise computer program instructions defining the step of determining at least a first unknown of said surface function using a singular value decomposition technique.

20. The computer readable medium of claim 14 further comprising computer program instructions defining the steps of:

determining said new x coordinate of said target vertex as an average of the x coordinates of said vertices in said plurality of neighboring vertices; and determining said new y coordinate of said target vertex as an average of the y coordinates of said vertices in said plurality of neighboring vertices.

21. The computer readable medium of claim 14 wherein said surface function comprises a quadratic function.

\* \* \* \* \*